(12) United States Patent
Sakashita et al.

(10) Patent No.: US 9,475,472 B2
(45) Date of Patent: Oct. 25, 2016

(54) BRAKE SYSTEM

(71) Applicant: HITACHI AUTOMOTIVE SYSTEMS, LTD., Ibaraki (JP)

(72) Inventors: Takayasu Sakashita, Tokyo (JP); Hirotaka Oikawa, Yokohama (JP); Kimio Nishino, Atsugi (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/469,052

(22) Filed: Aug. 26, 2014

(65) Prior Publication Data
US 2015/0061365 A1 Mar. 5, 2015

(30) Foreign Application Priority Data

Aug. 30, 2013 (JP) ................................. 2013-180274

(51) Int. Cl.
| | |
|---|---|
| *B60T 11/10* | (2006.01) |
| *B60T 7/04* | (2006.01) |
| *B60T 13/58* | (2006.01) |
| *B60T 13/66* | (2006.01) |
| *B60T 13/74* | (2006.01) |

(52) U.S. Cl.
CPC .............. *B60T 11/103* (2013.01); *B60T 7/042* (2013.01); *B60T 13/588* (2013.01); *B60T 13/662* (2013.01); *B60T 13/741* (2013.01)

(58) Field of Classification Search
CPC ...... B60T 11/103; B60T 7/042; B60T 7/045; B60T 13/588; B60T 13/741; B60T 13/662
See application file for complete search history.

(56) References Cited

U.S. PATENT DOCUMENTS

| | | | |
|---|---|---|---|
| 2009/0206650 A1* | 8/2009 | Ninoyu ................. | B60T 13/588 303/3 |
| 2010/0072811 A1 | 3/2010 | Kondo et al. | |
| 2011/0295478 A1* | 12/2011 | Jeon ........................ | B60T 7/107 701/70 |

FOREIGN PATENT DOCUMENTS

| | | | | |
|---|---|---|---|---|
| JP | 2010-76479 | | 4/2010 | |
| KR | 20110131945 A | * | 12/2011 | .............. B60T 7/107 |

* cited by examiner

*Primary Examiner* — Melanie Torres Williams
(74) *Attorney, Agent, or Firm* — Wenderoth, Lind & Ponack, L.L.P.

(57) ABSTRACT

A brake system includes a brake apparatus. This brake apparatus is configured to keep a vehicle braked by an electric mechanism in response to a parking brake request signal, and brake the vehicle by supply of a hydraulic pressure from a hydraulic source in response to an operation performed on a brake pedal. The brake system further includes a controller configured to drive the electric mechanism until a target pressing force is acquired to establish a brake holding state in response to the parking brake request signal. The controller is configured to change the target pressing force according to a change in a hydraulic pressure in the brake apparatus after starting driving the electric mechanism in response to the parking brake request signal.

17 Claims, 7 Drawing Sheets

BRAKE SYSTEM

CROSS-REFERENCE TO RELATED APPLICATION

The present application claims priority under 35 U.S.C. 119 to Japanese Patent Application No. 2013-180274, filed on Aug. 30, 2013. The entire disclosure of Japanese Patent Application No. 2013-180274, filed on Aug. 30, 2013 including the specification, claims, drawings and summary is incorporated herein by reference in its entirety.

TECHNICAL FIELD

The present invention relates to a brake system that exerts a braking force on a vehicle such as an automobile.

BACKGROUND ART

Vehicles such as automobiles are provided with a brake system configured to exert a braking force on the vehicle by supplying a brake hydraulic pressure to a brake apparatus for each wheel according to an amount of an operation performed on a brake pedal. If this brake apparatus is, for example, a disk brake, the brake apparatus externally supplies the hydraulic pressure into a cylinder of a caliper to press a brake pad pushed by a piston against a surface of a disk, thereby generating the braking force.

One known type of disk brake of this kind is a hydraulic disk brake equipped with an electric parking brake function of generating a braking force based on driving (a rotation) of an electric motor (i.e., actuating the disk brake as a parking brake), for example, when a driver stops or parks the vehicle, in addition to generating the braking force based on the hydraulic pressure when the vehicle is running (for example, refer to Japanese Patent Application Public Disclosure No. 2010-76479).

The disk brake equipped with the electric parking brake function according to the conventional technique is configured to move the piston toward the disk by driving the electric motor when generating the braking force as the parking brake. A control apparatus (a controller), which controls the driving of the electric motor, determines that the piston generates a pressing force that should be generated (hereinafter also referred to as a target pressing force) when a current of the electric motor reaches a preset target current value (a current threshold value), and then stops driving the electric motor.

If the driver actuates the parking brake while, for example, pressing the brake pedal, the disk brake equipped with the electric parking brake function drives the electric motor with the hydraulic pressure exerted on the piston. In this case, stopping the driving of the electric motor according to the same condition as the condition when no hydraulic pressure is exerted on the piston may result in exertion of an excessive braking force as the parking brake. Therefore, a parking brake controller discussed in Japanese Patent Application Public Disclosure No. 2010-76479 corrects the target current value according to a pressure in a master cylinder (hereinafter also referred to as an M/C pressure) when starting braking the vehicle with use of the electric motor.

However, the parking brake controller discussed in Japanese Patent Application Public Disclosure No. 2010-76479 corrects the target current value only once when starting braking the vehicle with use of the electric motor. Therefore, if the hydraulic pressure exerted on the piston decreases before the current of the electric motor reaches this target current value after this correction is made, this may lead to generation of a weaker force than a force required to keep the vehicle parked, as the braking force of the parking brake. On the other hand, if the hydraulic pressure increases, this may lead to generation of an excessive force as the braking force of the parking brake.

SUMMARY

The present invention has been conceived in consideration of the above-described problem with the conventional technique, and one object thereof is to provide a brake system capable of preventing or reducing excessiveness and/or insufficiency of the braking force generated by the parking brake.

A brake system according to an aspect of the present invention includes a brake apparatus including an electric mechanism and a hydraulic source and configured to keep a vehicle braked by the electric mechanism in response to a parking brake request signal and brake the vehicle by supply of a hydraulic pressure from the hydraulic source in response to an operation performed on a brake pedal, and a controller configured to drive the electric mechanism until a target pressing force is acquired to establish a brake holding state in response to the parking brake request signal. The controller is configured to change the target pressing force according to a change in a hydraulic pressure in the brake apparatus after starting driving the electric mechanism in response to the parking brake request signal.

According to the present invention, it is possible to prevent or reduce excessiveness and/or insufficiency of the braking force generated by the parking brake.

DESCRIPTION OF EMBODIMENTS

In the following description, a brake system according to an embodiment of the present invention will be described in detail with reference to the accompanying drawings based on an example in which this brake system is mounted on a four-wheeled automobile.

Figure 1:
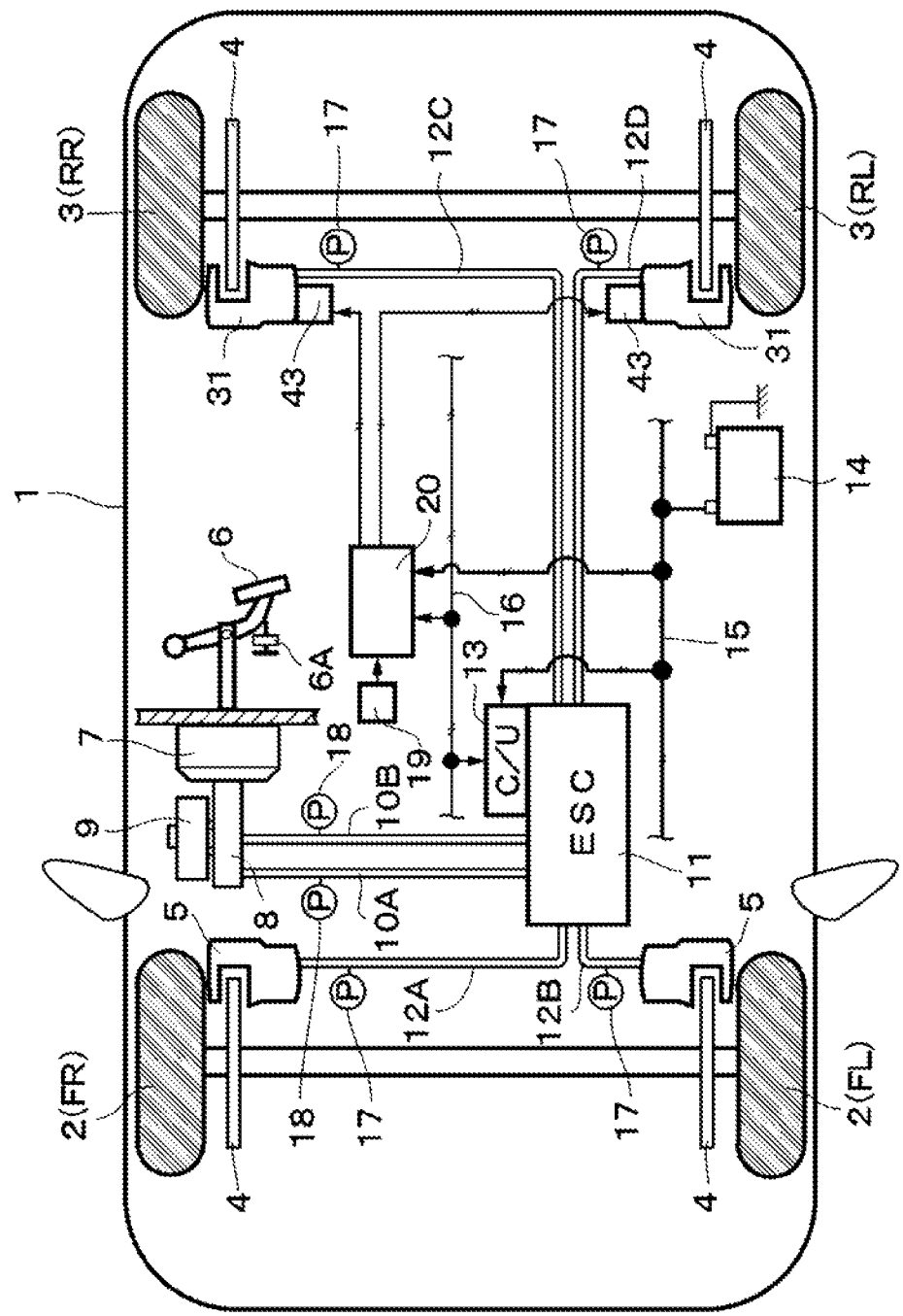
FIG. 1 illustrates a concept of a vehicle with a brake system according to an embodiment of the present invention mounted thereon.

Referring to FIG. 1, four wheels, for example, front left and right wheels 2 (FL and FR) and rear left and right wheels 3 (RL and RR) are disposed under (on a road surface side) a vehicle body 1, which constitutes a main structure of the vehicle. A disk rotor 4 is disposed at each of these front and rear wheels 2 and 3 as a rotational member (a disk) rotatable together with each of the wheels (each of the front and rear wheels 2 and 3). Each disk rotor 4 is sandwiched by a hydraulic disk brake 5 at each of the front wheels 2, and each disk rotor 4 is sandwiched by a hydraulic disk brake 31 equipped with an electric parking brake function at each of the rear wheels 3. As a result, a braking force is exerted on each of the wheels (each of the front and rear wheels 2 and 3) independently of one another.

A brake pedal 6 is disposed on a front board side of the vehicle body 1. The brake pedal 6 is operated by being pressed by a driver, when the driver brakes the vehicle. A brake operation detection sensor (hereinafter also referred to as a brake sensor) 6A such as a pedal switch or a pedal stroke sensor are disposed at the brake pedal 6. This brake operation detection sensor 6A detects whether the brake pedal 6 is operated by being pressed, or how much this operation is performed, and outputs a detection signal therefrom to a hydraulic supply apparatus controller 13. The brake operation detection sensor 6A may output the detection signal to a parking brake controller 20, which will be described below.

A pressing operation performed on the brake pedal 6 is transmitted to a master cylinder 8, which functions as a hydraulic source, via a booster 7. The booster 7 includes a negative pressure booster or an electric booster disposed between the brake pedal 6 and the master cylinder 8, and transmits a pressing force to the master cylinder 8 while increasing it when the pressing operation is performed on the brake pedal 6. At this time, the master cylinder 8 generates a hydraulic pressure with the aid of brake fluid supplied form a master reservoir 9. The master reservoir 9 functions as a hydraulic fluid tank containing the brake fluid. The mechanism for generating a hydraulic pressure by the brake pedal 6 is not limited to the above-described configuration, and may be any mechanism that can generate a hydraulic pressure in response to an operation performed on the brake pedal 6, such as a brake-by-wire type mechanism.

The hydraulic pressure generated in the master cylinder 8 is transmitted to a hydraulic supply apparatus 11 (hereinafter referred to as the ESC 11) as a hydraulic control mechanism via, for example, a pair of cylinder-side hydraulic pipes 10A and 10B. This ESC 11 distributes and supplies the hydraulic pressure from the master cylinder 8 to the respective disk brakes 5 and 31 via brake-side pipe portions 12A, 12B, 12C, and 12D. As a result, a braking force is exerted on each of the wheels (each of the front and rear wheels 2 and 3) independently of one another as described above.

The ESC 11 is disposed between the respective disk brakes 5 and 31 and the master cylinder 8. The ESC 11 can supply the hydraulic pressure to the respective disk brakes 5 and 31 even in a different manner from supplying the hydraulic pressure according to an amount of an operation performed on the brake pedal 6. Therefore, the ESC 11 includes the hydraulic supply apparatus controller 13 (hereinafter referred to as the control unit 13) that controls an operation of the ESC 11. The control unit 13 drives and controls the ESC 11, thereby performing control for increasing, reducing, or maintaining the brake hydraulic pressures to be supplied from the brake-side pipe portions 12A to 12D to the respective disk brakes 5 and 31. This operation realizes execution of various kinds of brake control such as boosting control, braking force distribution control, brake assist control, anti-skid control, traction control, vehicle stability control (including skid prevention), and hill start aid control.

The control unit 13 includes a microcomputer, and power is supplied from a battery 14 to the control unit 13 via a power source line 15. Further, as illustrated in FIG. 1, the control unit 13 is connected to a vehicle data bus 16. The ESC 11 may be replaced with an ABS unit, which is a known art. Alternatively, the master cylinder 8 may be directly connected to the brake-side pipe portions 12A to 12D without the ESC 11 provided therebetween (i.e., with the ESC 11 omitted therefrom).

The vehicle data bus 16 includes a CAN (Controller Area Network) as a serial communication unit mounted on the vehicle body 1, and performs multiplex communication in the vehicle among a large number of electric devices mounted on the vehicle, the control unit 13, the parking brake controller 20, and the like. In this case, examples of vehicle information transmitted to the vehicle data bus (CAN) 16 include information indicated by detection signals from a steering angle sensor, an accelerator sensor, a brake sensor (the brake operation detection sensor 6A), a wheel speed sensor, a vehicle speed sensor, an inclination sensor, a stereo camera, a millimeter-wave radar, a seat belt sensor, a transmission, and the like. Further, the vehicle information includes information indicated by detection signals from W/C pressure sensors 17, M/C pressure sensors 18, and the like.

The W/C pressure sensors 17 as a wheel cylinder pressure detector are disposed at the brake-side pipe portions 12A, 12B, 12C, and 12D, respectively. The pressure sensors 17 individually detect pressures (i.e., hydraulic pressures) in the respective pipe, i.e., W/C hydraulic pressures PW/C in calipers 34 (more specifically, cylinder portions 36) corresponding to these pipe. Alternatively, a single W/C pressure sensor 17 may be provided at a single pipe system. For example, if the brake-side pipe portions 12A, 12B, 12C, and 12D are X-type pipes, a single W/C pressure sensor 17 may be provided at any one of the brake-side pipe portions 12A and 12D, and a single W/C pressure sensor 17 may be provided at any one of the brake-side pipe portions 12B and 12C. Further alternatively, only a single W/C pressure sensor 17 may be provided at one of the system constituted by the brake-side pipe portions 12A and 12D and the system constituted by the brake-side pipe portions 12B and 12C. Further alternatively, no W/C pressure sensor 17 may be provided, and the control unit 13 of the ESC 11 may estimate (i.e., calculate) the pipe inner pressures (the W/C hydraulic pressures PW/C) of the brake-side pipe portions 12A, 12B, 12C, and 12D from detection signals of the M/C pressure sensors 18.

The M/C pressure sensors 18 as a master cylinder pressure detector are disposed at the cylinder-side hydraulic pipes 10A and 10B, respectively, and detect pressures in the respective pipes, i.e., M/C hydraulic pressures PM/C of the master cylinder 8 corresponding to the respective pies for respective pipe systems (a primary side and a secondary side). In other words, the M/C pressure sensors 18 detect the M/C hydraulic pressures PM/C to be supplied to the calipers 34. Alternatively, only a single M/C pressure sensor 18 may be provided, and may be provide only at, for example, the primary side.

Further alternatively, a stroke sensor may be provided at the booster 7. In this case, the M/C hydraulic pressure PM/C may be estimated and calculated from a stroke detected by the stroke sensor. Further alternatively, the M/C hydraulic pressure PM/C may be estimated and calculated from an operation amount (a stroke amount) detected by the brake operation detection sensor (the brake sensor) 6A disposed at the brake pedal 6. Further alternatively, if an electric actuator is used as the booster 7, the M/C hydraulic pressure PM/C may be estimated and calculated from a current value or a stroke amount (an operation amount) of this electric actuator. In this case, if a pressure sensor is mounted in the electric actuator, the M/C hydraulic pressure PM/C may be estimated and calculated with use of a detection value of this pressure sensor.

Detection signals of the W/C pressure sensors 17 and the M/C pressure sensors 18, or the estimated and calculated hydraulic pressure values are transmitted to the vehicle data bus 16 as information regarding the W/C hydraulic pressures PW/C and the M/C hydraulic pressures PM/C. The large number of electric devices mounted on the vehicle can acquire various kinds of vehicle information including the W/C hydraulic pressures PW/C and the M/C hydraulic pressures PM/C via the vehicle data bus 16. The parking brake controller 20, which will be described below, is included in these electric devices.

A parking brake switch 19 is disposed at the vehicle body 1 so as to be located near a driver's seat (not illustrated). This parking brake switch 19 is operated by the driver. When the parking brake switch 19 is operated to a brake applying side (a parking brake ON side), power is supplied from the parking brake controller 20 to the disk brake 31 for the rear wheel 3 for rotating an electric actuator 43 to a brake applying side. As a result, the disk brake 31 for the rear wheel 3 is actuated as the parking brake. On the other hand, to release the actuation as the parking brake, the parking brake switch 19 is operated to a brake releasing side (a parking brake OFF side), and power is supplied to the disk brake 31 for rotating the electric actuator 43 in a reverse direction according to this operation. As a result, the disk brake 31 for the rear wheel 3 is released from the actuation as the parking brake.

The parking brake may be automatically actuated according to a parking brake actuation determination logic performed by the parking brake controller 20, for example, when the vehicle speed is maintained at 0 km/h for a predetermined time period, when an engine stops operating, and when a shift lever is operated into a P (parking) position. Further, the parking brake may be automatically released according to a parking brake release determination logic performed by the parking brake controller 20 based on an operation on an accelerator or the like. In the present embodiment, a parking brake request signal, which is a signal indicating actuation of the parking brake, includes not only a signal output from the parking brake switch 19 but also an actuation instruction issued based on the above-described parking brake actuation determination logic.

The parking brake controller 20 includes a microcomputer. Power is supplied from the battery 14 to the parking brake controller 20 via the power source line 15. The parking brake controller 20 controls actuation of the disk brake 31 (thus, driving of the electric actuator 43), and generates a braking force, for example, when the driver stops or parks the vehicle.

When the parking brake switch 19 is operated by the driver of the vehicle, the parking brake controller 20 drives the electric actuator 43 based on a signal (an ON or OFF signal) output from the parking brake switch 19, thereby actuating (applying) or stopping (releasing) the disk brake 31 as the parking brake. Further, the parking brake controller 20 drives the electric actuator 43 to actuate and/or release the disk brake 31 based on at least one of the above-described parking brake actuation determination logic and release determination logic.

As illustrated in FIG. 1, an input side of the parking brake controller 20 is connected to the parking brake switch 19 and the like, and an output side of the parking brake controller 20 is connected to the electric actuators 43 and the like of the disk brakes 31. Further, the parking brake controller 20 is connected to the control unit 13 of the ESC 11 and the like via the vehicle data bus 16. The parking brake controller 20 can acquire various kinds of vehicle state amounts i.e., the above-described various kinds of vehicle information pieces required to actuate and/or release the parking brake from the vehicle data bus 16. Alternatively, sensors that detect the vehicle information may be directly connected to the parking brake controller 20, and the vehicle information acquired from the vehicle data bus 16 may be instead acquired from these sensors. Further, the parking brake controller 20 may be provided integrally with the control unit 13 of the ESC 11.

The parking brake controller 20 includes a storage unit (not illustrated) including for example, a flash memory, a ROM, a RAM, or an EEPROM. This storage unit stores a program for the above-described parking brake actuation determination logic and/or release determination logic, a processing program for executing processing flows illustrated in FIGS. 3 to 5 that will be described below, i.e., a processing program for use in control processing performed when the parking brake is actuated (applied), and the like.

Further, the parking brake controller 20 contains a voltage sensor for detecting a voltage of the power source line 15, and a current sensor and a voltage sensor (both of them are not illustrated) for detecting a current of each of the left and right electric actuators 43 or a voltage between terminals. This provision allows the parking brake controller 20 to stop driving the electric actuator 43 based on a motor current value IM of the electric actuator 43 when actuating (applying) the parking brake.

The parking brake controller 20 drives the electric actuator 43 until the target pressing force can be acquired to establish a brake holding state in response to the parking brake request signal generated by the parking brake switch 19 or according to the above-described parking brake actuation determination logic. In this case, the target pressing force is set according to a current threshold value (a target current value A1) for stopping driving the electric actuator 43. On the other hand, the parking brake controller 20 detects or estimates the hydraulic pressure P of the disk brake 31, i.e., the hydraulic pressure P in the caliper 34 (or a change therein) when driving the electric actuator 43. The hydraulic pressure P in the caliper 34 can be detected from the hydraulic pressure (PW/C or PM/C) directly corresponding to the hydraulic pressure P, such as the W/C hydraulic pressure PW/C detected by the W/C pressure sensor 17, the M/C hydraulic pressure PM/C detected by the M/C pressure sensor 18, and the W/C hydraulic pressure PW/C calculated from the M/C hydraulic pressure PM/C, or information (a state amount) S that allows the hydraulic pressure P to be estimated, depending on a situation.

Then, the parking brake controller 20 changes the current threshold value (the target current value) according to a change in the hydraulic pressure P in the caliper 34 (for example, the W/C hydraulic pressure PW/C, the M/C hydraulic pressure PM/C, or the information S that allows the hydraulic pressure P to be estimated), after starting driving the electric actuator 43 in response to the parking brake request signal. The change in the current threshold value means a change in the target pressing force. More specifically, when driving the electric actuator 43, the parking brake controller 20 corrects the target current value A1 to a value corresponding to the hydraulic pressure P at that time based on a relationship between the hydraulic pressure P and the target current value (the current threshold value) A1 illustrated in FIG. 6 (the details of which will be described below). Then, when the current value of the electric actuator 43 reaches the corrected target current value A1, the parking brake controller 20 stops driving the electric actuator 43, which completes establishment of the brake holding state.

Figure 6:
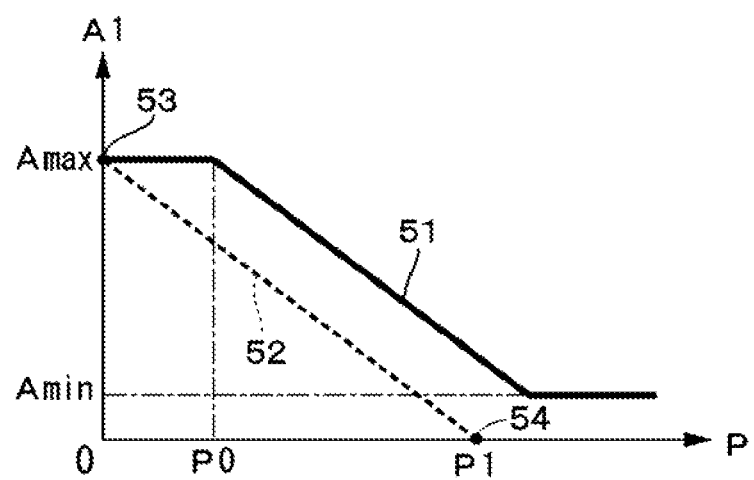
FIG. 6 is a characteristic diagram illustrating an example of a relationship between a hydraulic pressure P and a target current value A1.

As illustrated in FIG. 6, the target current value A1 is set so as to increase as the hydraulic pressure P decreases. Therefore, when the hydraulic pressure P is low, the parking brake controller 20 can stop driving the electric actuator 43 with a large target current value A1 supplied thereto. On the other hand, when the hydraulic pressure P is high, the parking brake controller 20 can stop driving the electric actuator 43 with a small target current value A1 supplied thereto. As a result, even with a change in the hydraulic pressure P while the electric actuator 43 is driven, the parking brake controller 20 can stop driving the electric actuator 43 while ensuring an appropriate target pressing force (the target current value A1) according to the hydraulic pressure P at that time. The control of the electric actuator 43 when the parking brake is actuated (applied) in this manner will be described in detail below.

In the present embodiment, the parking brake controller 20 is prepared as another device than the control unit 13 of the ESC 11. However, the parking brake controller 20 and the control unit 13 may be configured as a single integrated device. Further, in the present embodiment, the parking brake controller 20 is configured to control the two left and right disk brakes 31. However, the parking brake controller 20 may be provided for each of the left and right disk brakes 31. In this case, the parking brake controller 20 may be provided integrally with the disk brake 31.

Figure 2:
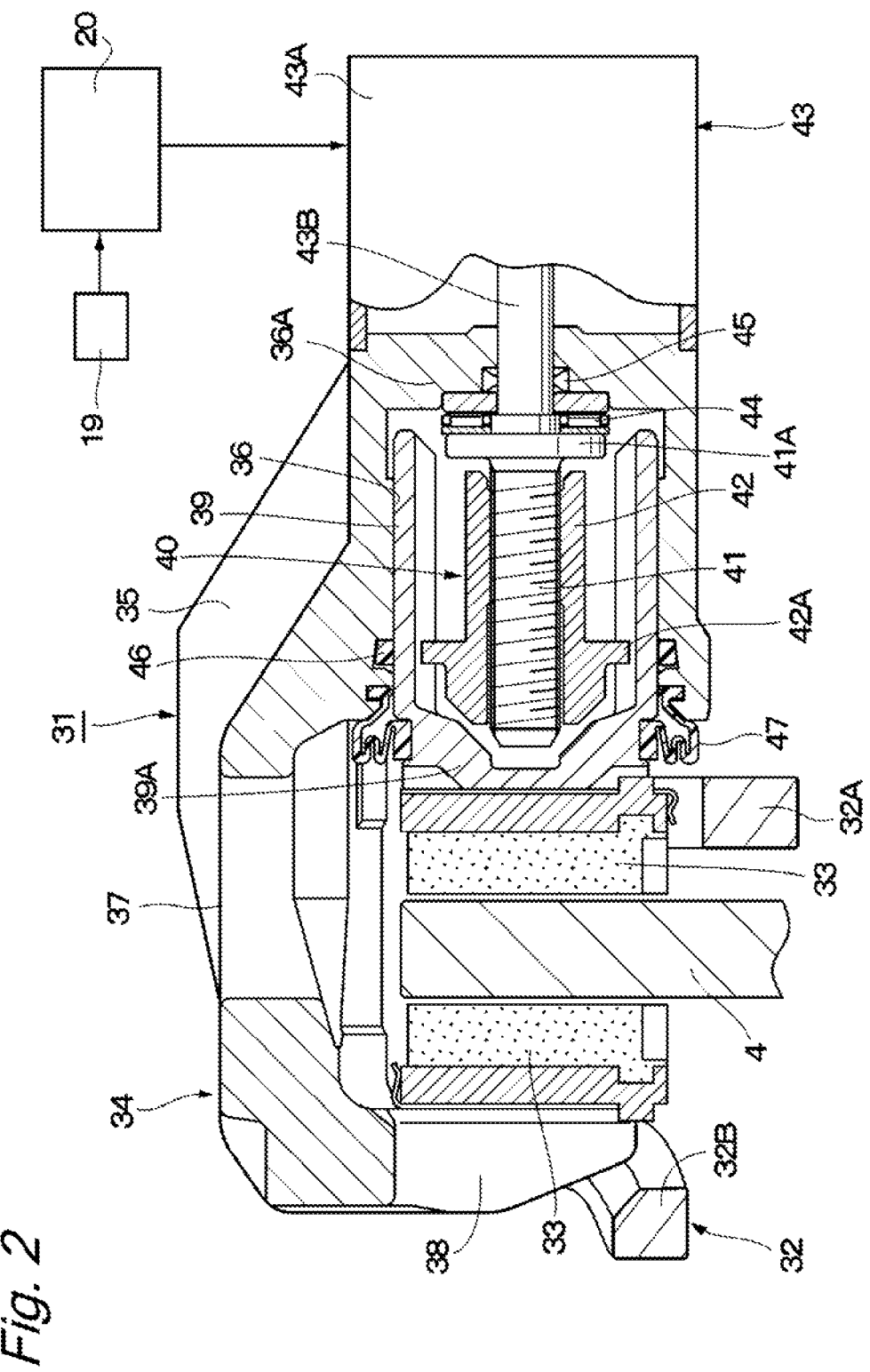
FIG. 2 is an enlarged vertical cross-sectional view illustrating a disk brake equipped with an electric parking brake function, which is mounted for a rear wheel illustrated in FIG. 1.

Next, the configurations of the disk brakes 31 equipped with the electric parking brake function, which are mounted for the rear left and right wheels 3, will be described with reference to FIG. 2. FIG. 2 illustrates only one of the disk brake 31 for the rear left wheel 3 and the disk brake 31 for the rear right wheel 3.

Each of the pair of disk brakes 31 respectively mounted on the left and right sides of the vehicle is a hydraulic disk brake having the electric parking brake function. More specifically, the disk brake 31 is a brake apparatus that can keep the vehicle braked by the electric actuator 43 in response to the parking brake request signal (for example, an ON signal from the parking brake switch 19 or an actuation instruction based on the above-described parking brake actuation determination logic), and can also brake the vehicle by a hydraulic supply from the master cylinder 8 (and/or the ESC 11), which is the hydraulic source, in response to an operation performed on the brake pedal 6.

The disk brake 31 includes a mount member 32 mounted on a non-rotatable portion of the rear wheel 3 of the vehicle, the inner-side and outer-side brake pads 33 as a frictional member, and the caliper 34 containing the electric actuator 43.

The mount member 32 includes a pair of arm portions (not illustrated) extending in an axial direction of the disk rotor 4 (i.e., a disk axial direction) over an outer circumference of the disk rotor 4 and spaced apart from each other in a disk circumferential direction. The mount member 32 further includes a thick support portion 32A disposed so as to integrally connect proximal end sides of the respective arm portions with each other and fixed to the non-rotatable portion of the vehicle at a position on an inner side of the disk rotor 4. Further, the mount member 32 integrally includes a reinforcement beam 32B coupling distal end sides of the respective arm portions with each other at a position on an outer side of the disk rotor 4.

In this manner, the respective arm portions of the mounting member 32 are integrally coupled to each other by the support portion 32A on the inner side of the disk rotor 4, and are integrally coupled to each other by the reinforcement beam 32B on the outer side of the disk rotor 4. The inner-side and outer-side brake pads 33 are disposed so as to be able to abut against both surfaces of the disk rotor 4 rotating together with the wheel (more specifically, the rear wheel 3) of the vehicle, and are supported by the respective arm portions of the mounting member 32 so as to be movable in the disk axial direction. The inner-side and outer-side brake pads 33 are pressed against the both surfaces of the disk rotor 4 by the caliper 34 (a caliper main body 35 and the piston 39).

The caliper 34 is disposed at the mount member 32 so as to extend over the disk rotor 4 in the disk axial direction. The caliper 34 includes the caliper main body 35 supported so as to be movable along the axial direction of the disk rotor 4 relative to the respective arm portions of the mount member 32, and the piston 39 disposed in the caliper main body 35. The rotation-linear motion conversion mechanism 40 and the electric actuator 43 are disposed in the caliper 34. The caliper 34 presses (thrusts) the brake pad 33 with use of the piston 39 actuated by a hydraulic pressure generated according to an operation performed on the brake pedal 6.

The caliper main body 35 includes the cylinder portion 36, a bridge portion 37, and a claw portion 38. The cylinder portion 36 is formed into a bottomed cylindrical shape having one axial side closed by a partition wall portion 36A, and the other axial side opened while facing the disk rotor 4. The bridge portion 37 is formed to extend from the cylinder portion 36 in the disk axial direction so as to straddle over the disk rotor 4 in the disk axial direction. The claw portion 38 is arranged on an opposite side from the cylinder portion 36 so as to extend from the bridge portion 37 toward a radially inner side. The cylinder portion 36 of the caliper main body 35 functions as an inner leg portion that is provided on one side (the inner side) of the disk rotor 4 and presses the inner-side brake pad 33. The claw portion 38 functions as an outer leg portion that is provided on the opposite side (the outer side) of the disk rotor 4 and presses the outer-side brake pad 33.

The hydraulic pressure is supplied into the cylinder portion 36 of the caliper main body 35 via the brake-side pipe portion 12C or 12D illustrated in FIG. 1 in response to a pressing operation performed on the brake pedal 6 or the like. The partition wall portion 36A is integrally formed at the cylinder portion 36. The partition wall portion 36A is located between the cylinder portion 36 and the electric motor 43. The partition wall portion 36A includes an axially penetrating hole. An output shaft 43B of the electric motor 43 is rotatably inserted on an inner circumferential side of the partition wall portion 36A. The piston 39 as a pressing member, and the rotation-linear motion conversion mechanism 40 are disposed in the cylinder portion 36 of the caliper main body 35. In the present embodiment, the rotation-linear motion conversion mechanism 40 is contained in the piston 39. However, the rotation-linear motion conversion mechanism 40 does not necessarily have to be contained in the piston 39, as long as the rotation-linear motion conversion mechanism 40 is configured to thrust the piston 39.

The piston 39 is opened on one axial side, and the other axial side of the piston 39 that faces the inner-side brake pad 33 is closed by the cover portion 39A. This piston 39 is inserted in the cylinder 36. Further, the rotation-linear motion conversion mechanism 40 is contained within the piston 39, and the piston 39 is configured to be thrust by the rotation-linear motion conversion mechanism 40 in an axial direction of the cylinder portion 36. The rotation-linear motion conversion mechanism 40 functions as a pressing member holding mechanism. More specifically, the rotation-linear motion conversion mechanism 40 thrusts the piston 39 in the caliper 34 with the aid of an external force different from a force generated by the above-described hydraulic supply into the cylinder portion 36, i.e., a force generated by the electric actuator 43, and holds the thrust piston at that position. Since the left and right disk brakes 31 are mounted for the rear left and right wheels 3, respectively, the rotation-linear motion conversion mechanisms 40 and the electric actuators 43 are also mounted on the left and right sides of the vehicle, respectively.

The rotation-linear motion conversion mechanism 40 includes a screw member 41 including a rod-like body with a male screw such as a trapezoidal thread formed thereon, and a linearly movable member 42 serving as a thrust member with a female screw hole of a trapezoidal thread formed on an inner circumferential side thereof. In other words, the rotation-linear motion conversion mechanism 40 converts a rotational motion of the screw member 41 threadably engaged with the inner circumferential side of the linearly movable member 42 into a linear motion of the linearly movable member 42. The rotational motion of the screw member 41 is provided by the electric actuator 43. The female screw of the linearly movable member 42 and the make screw of the screw member 41 are formed with use of highly irreversible screws (trapezoidal threads in the present embodiment), thereby realizing the function as the pressing member holding mechanism. This pressing member holding mechanism (the rotation-linear motion conversion mechanism 40) is configured to hold the linearly movable member 42 (thus, the piston 39) at an arbitrary position with the aid of a frictional force (a holding force) within the rotation-linear motion conversion mechanism 40 even during a stop of power supply to the electric motor 43, thereby achieving energy saving. The pressing member holding mechanism may be any mechanism that can hold the piston 39 at a position to which the piston 39 is thrust by the electric actuator 43. For example, the pressing member holding mechanism may include another highly irreversible screw than the trapezoidal thread.

The screw member 41 disposed so as to be threadably engaged with the inner circumferential side of the linearly movable member 42 includes a flange portion 41A as a large-diameter flange on one axial side. The other axial side of the screw member 42 extends toward the cover portion 39A of the piston 39. The screw member 41 is integrally coupled to the output shaft 43B of the electric actuator 43 on the one axial side thereof where the flange portion 41A is formed. Further, an engagement protrusion 42A is formed on an outer circumferential side of the linearly movable member 42. The engagement protrusion 42A prohibits the linearly movable member 42 from rotating relative to the piston 39 (prohibits a relative rotation) while allowing the linearly movable member 42 to axially move relative to the piston 39.

The electric actuator 43 as an electric mechanism (an electric motor or a parking brake actuator) is disposed in a casing 43A. This casing 43A is fixed to the cylinder portion 36 of the caliper main body 35 at a position outside the partition wall portion 36A. The electric actuator 43 includes a motor including a stator, a rotor, and the like according to the known technique, and a reducer that amplifies a torque of the motor (all of them are not illustrated). The reducer includes the output shaft 43B that outputs the rotational torque after the amplification. The output shaft 43B axially extends through the partition wall portion 36A of the cylinder portion 36, and is coupled to an end of the screw member 41 where the flange portion 41A is formed in the cylinder portion 36 so as to be rotatable integrally with the screw member 41.

Coupling between the output shaft 43B and the screw member 41 may be configured, for example, so as to allow them to move in the axial direction but prevent them from rotating in the rotational direction. In this case, the output shaft 43B and the screw member 41 are coupled with each other using a known technique such as spline fitting or fitting using a polygonal rod (non-circular fitting). The reducer may be embodied by, for example, a planetary gear reducer or a worm gear reducer. Further, if the reducer is embodied by a known reducer unable to operate reversely (an irreversible reducer) such as a worm gear reducer, the rotation-linear motion conversion mechanism 40 can be embodied by a known reversible mechanism such as a ball screw or a ball ramp mechanism. In this case, the pressing member holding mechanism can be realized by, for example, the reversible rotation-linear motion conversion mechanism and the irreversible reducer.

When the parking brake switch 19 illustrated in FIGS. 1 and 2 is operated by the driver, power is supplied from the parking brake controller 20 to the electric actuator 43 (the motor thereof), thereby rotating the output shaft 43B of the electric actuator 43. Therefore, the screw member 41 of the rotation-linear motion conversion mechanism 40 is rotated integrally with the output shaft 43B in one direction, and thrusts (drives) the piston 39 toward the disk rotor 4 through the linearly movable member 42. As a result, the disk brake 31 sandwiches the disk rotor 4 between the inner-side and outer-side brake pads 33, thereby being actuated (applied) as the electric parking brake.

On the other hand, when the parking brake switch 19 is operated toward the brake releasing side, the screw member 41 of the rotation-linear motion conversion mechanism 40 is rotationally driven by the electric actuator 43 in the other direction (the reverse direction). As a result, the piston 39 is driven away from the disk rotor 4 in a retracting direction via the linearly movable member 42, whereby the disk brake 31 stops operating as the parking brake (the disk brake 31 is released from the actuation as the parking brake).

In this case, in the rotation-linear motion conversion mechanism 40, a relative rotation of the screw member 41 relative to the linearly movable member 42 causes the linearly movable member 42 to axially relatively move according to a rotational angle of the screw member 41 because the linearly movable member 42 is prohibited from being rotated in the piston 39. In this manner, the rotation-linear motion conversion mechanism 40 converts a rotational motion into a linear motion, which causes the linearly movable member 42 to thrust the piston 39. Further, in addition thereto, the rotation-linear motion conversion mechanism 40 holds the piston 39 at a position to which it is thrust by the electric actuator 43, by holding the linearly movable member 42 at an arbitrary position with the aid of the frictional force.

A thrust bearing 44 is disposed on the partition wall portion 36A of the cylinder portion 36 between the partition wall portion 36A and the flange portion 41A of the screw member 41. This thrust bearing 44 receives a thrust load from the screw member 41 together with the partition wall portion 36A, and facilitate a smooth rotation of the screw member 41 relative to the partition wall portion 36A. Further, a seal member 45 is disposed on the partition wall portion 36A of the cylinder portion 36 between the partition wall portion 36A and the output shaft 43B of the electric actuator 43. The seal member 45 seals between the partition wall portion 36A and the output shaft 43B so as to prevent the brake fluid in the cylinder portion 36 from leaking toward the electric actuator 43.

Further, a piston seal 46 as an elastic seal for sealing between the cylinder portion 36 and the piston 39, and a dust boot 47 for preventing a foreign object from entering into the cylinder portion 36 are disposed on the opening end side of the cylinder portion 36. The dust boot 47 is a flexible bellows-like seal member, and is attached between the opening end of the cylinder portion 36 and an outer circumference of the other axial side of the piston 39 where the cover portion 39A is formed.

The disk brakes 5 for the front wheels 2 are configured in a substantially similar manner to the disk brakes 31 for the rear wheels 3, except for the provision of the parking brake mechanism. In other words, the disk brakes 5 for the front wheels 2 do not include the rotation-linear motion conversion mechanism 40, the electric actuator 43, and the like that operate as the parking brake, which the disk brakes 31 for the rear wheels 3 include. Alternatively, the disk brakes 31 equipped with the electric parking brake function may be also mounted for the front wheels 2, instead of the disk brakes 5.

The present embodiment has been described based on the example in which this is employed for the hydraulic disk brake 31 having the electric parking brake function. However, an embodiment of the present invention is not limited to the above-described disk brake 31, and can be any brake mechanism capable of exerting a pressing force based on two mechanisms, a hydraulic mechanism as the brake in normal use and an electric mechanism as the parking brake. For example, an embodiment of the present invention may be, for example, a hydraulic drum brake having the electric parking brake function.

The brake apparatus of the four-wheeled automobile according to the present embodiment is configured in the above-described manner, and an operation thereof will be described next.

When the brake pedal 6 is operated by being pressed by the driver of the vehicle, this pressing force is transmitted to the master cylinder 8 via the booster 7, and a brake hydraulic pressure is generated in the master cylinder 8. The hydraulic pressure generated in the master cylinder 8 is distributed to the respective disk brakes 5 and 31 via the cylinder-side hydraulic pipes 10A and 10B, the ESC 11, and the brake-side pipe portions 12A, 12B, 12C, and 12D, thereby exerting the braking forces onto the respective front left and right wheels 2 and the respective rear left and right wheels 3.

At this time, each of the disk brakes 31 for the rear wheels 3 operates in the following manner. The hydraulic pressure is supplied into the cylinder portion 36 of the caliper 34 via the brake-side pipe portion 12C or 12D, and the piston 39 is slidably displaced toward the inner-side brake pad 33 according to an increase in the hydraulic pressure in the cylinder portion 36. As a result, the piston 39 presses the inner-side brake pad 33 against one side surface of the disk rotor 4. A reaction force at this time causes the whole caliper 34 to be slidably displaced toward the inner side relative to the respective arm portions of the mount member 32.

As a result, the outer leg portion (the claw portion 38) of the caliper 34 moves so as to press the outer-side brake pad 33 against the disk rotor 4, and the disk rotor 4 is sandwiched from axial both sides by the pair of brake pads 33. As a result, the braking force is generated based on the hydraulic pressure. On the other hand, when the brake operation actuated by the brake pedal 6 is released, the supply of the hydraulic pressure into the cylinder portion 36 is stopped, whereby the piston 39 is displaced so as to retract into the cylinder portion 36 with the aid of a restoring force of the piston seal 16 from an elastic deformation. As a result, the inner-side and outer-side brake pads 33 are individually separated from the disk rotor 4, whereby the vehicle is returned into a non-braked state.

Next, when the parking brake switch 19 is operated by the driver of the vehicle for actuation (application) of the parking brake, power is supplied from the parking brake controller 20 to the electric actuator 43 of the disk brake 31, whereby the output shaft 43B of the electric actuator 43 is rotationally driven. The disk brake 31 equipped with the electric parking brake converts the rotational motion of the electric actuator 43 into a linear motion of the linearly movable member 42 through the screw member 41 of the rotation-linear motion conversion mechanism 40 to axially move the linearly movable member 42 to thrust the piston 39. As a result, the pair of brake pads 33 is pressed against the both surfaces of the disk rotor 4.

At this time, the linearly movable member 42 is maintained in a brake applying state with the aid of the frictional force (the holding force) generated between the linearly movable member 42 and the screw member 41, whereby the disk brake 31 for the rear wheel 3 is actuated as the parking brake, in other words, even after a stop of the power supply to the electric actuator 43, the linearly movable member 42 (thus, the piston 39) can be held at the brake applying position by the female screw of the linearly movable member 42 and the male screw of the screw member 41.

On the other hand, when the parking brake switch 19 is operated to the brake releasing side by the driver for a stop (release) of the parking brake, power is supplied from the parking brake controller 20 to the electric actuator 43 for rotating the motor in the reverse direction, whereby the output shaft 43B of the electric actuator 43 is rotated in the reverse direction of the direction at the time of actuation of the parking brake. At this time, this reverse rotation releases the braking force held by the screw member 41 and the linearly movable member 42, and the rotation-linear motion conversion mechanism 40 moves the linearly movable member 42 in a return direction, i.e., into the cylinder portion 36 by a movement amount corresponding to how much the electric actuator 43 is reversely rotated, thereby releasing the braking force of the parking brake (the disk brake 31).

If the driver brakes the vehicle with use of the electric actuator 43 (actuates the parking brake) with the brake pedal 6 pressed by the driver or with a hydraulic pressure supplied from the ESC 11, this results in driving of the electric actuator 43 with the hydraulic pressure exerted on the piston 39. In this case, stopping driving the electric actuator 43 under the same condition as the condition used when no hydraulic pressure is exerted on the piston 39 may lead to generation of an excessive braking force of the parking brake.

One of methods for solving this problem is to correct the target current value according to the master cylinder pressure (M/C pressure) when the vehicle starts to be braked with use of the electric motor (the electric actuator), like the technique discussed in the above-described patent literature, Japanese Patent Application Public Disclosure No. 2010-76479. However, the parking brake controller discussed in Japanese Patent Application Public Disclosure No. 2010-76479 corrects the target current value only once when the vehicle starts to be braked with use of the electric motor. Therefore, if the hydraulic pressure exerted on the piston decreases before the current value reaches the corrected target current value after the correction is made, this may lead to generation of a weaker force than a force required to keep the vehicle parked as the braking force of the parking brake. On the other hand, if the hydraulic pressure exerted on the piston increases before the current value reaches the corrected target current value after the target current value is corrected, this may lead to generation of an excessive force as the braking force of the parking brake.

Figure 4:
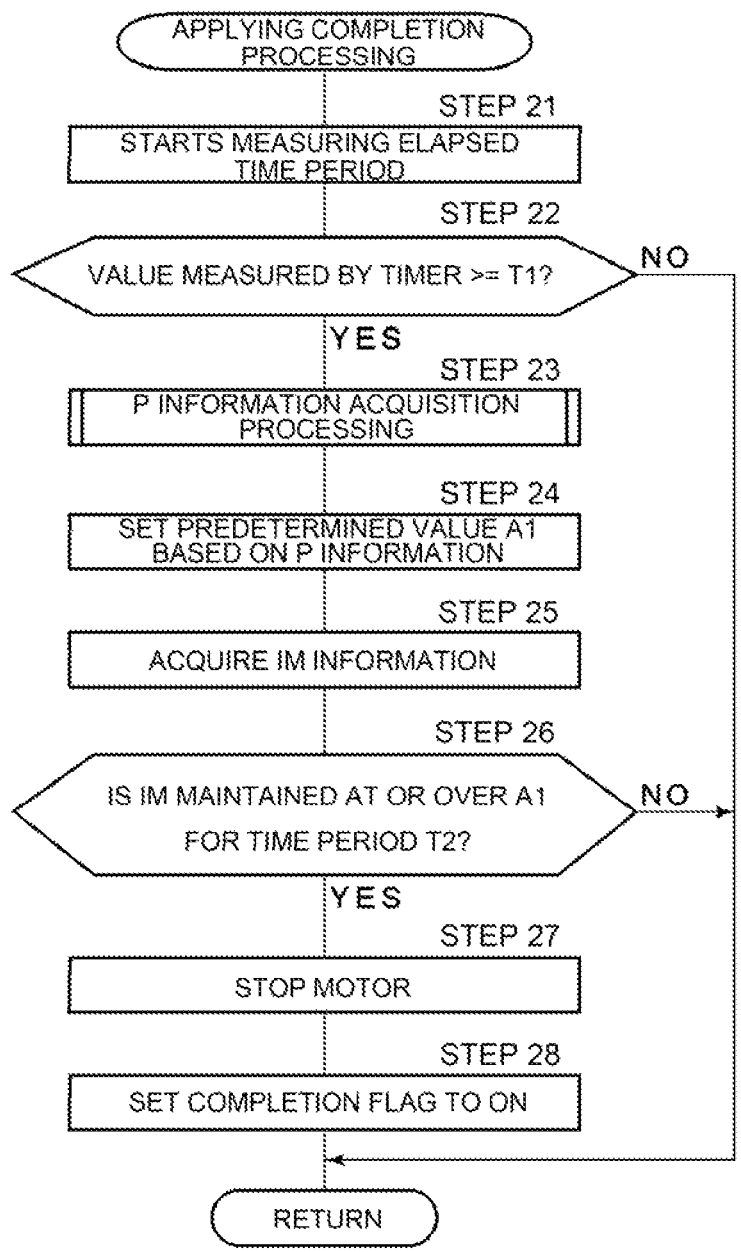
FIG. 4 is a flowchart illustrating applying completion processing illustrated in FIG. 3.
Figure 5:
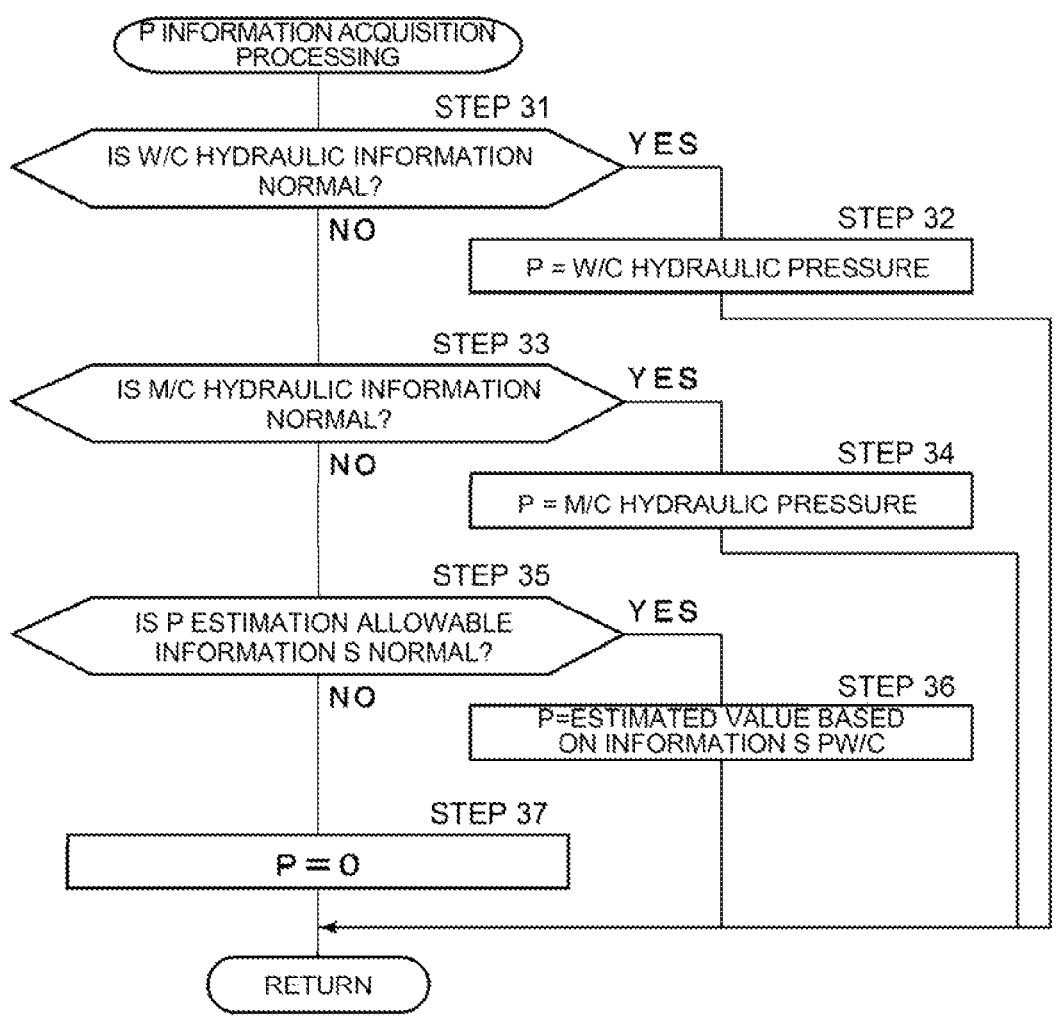
FIG. 5 is a flowchart illustrating P information acquisition processing illustrated in FIG. 4.

Therefore, according to the present embodiment, the parking brake controller 20 performs control of changing the target pressing force (the target current value A1) according to a change in the hydraulic pressure P in the caliper 34 after starting driving the electric actuator 43 in response to the parking brake request signal. The change in the hydraulic pressure P in the caliper 34 is determined based on the W/C hydraulic pressure PW/C, the M/C hydraulic pressure PM/C, or the information S that allows the hydraulic pressure P to be estimated. In the following description, the control processing that the parking brake controller 20 performs when actuating (applying) the parking brake will be described with reference to FIGS. 3 to 5. In the following description, the term "apply" will be used to refer to an operation for starting the parking brake, i.e., an operation of driving the electric actuator 43 to thrust the piston 39 by the rotation-linear motion conversion mechanism 40, and holding the thrust piston 39. Further, the processing illustrated in FIGS. 3 to 5 is repeated every time a predetermined time period has elapsed (for each predetermined sampling frequency) while power is supplied to the parking brake controller 20.

Figure 3:
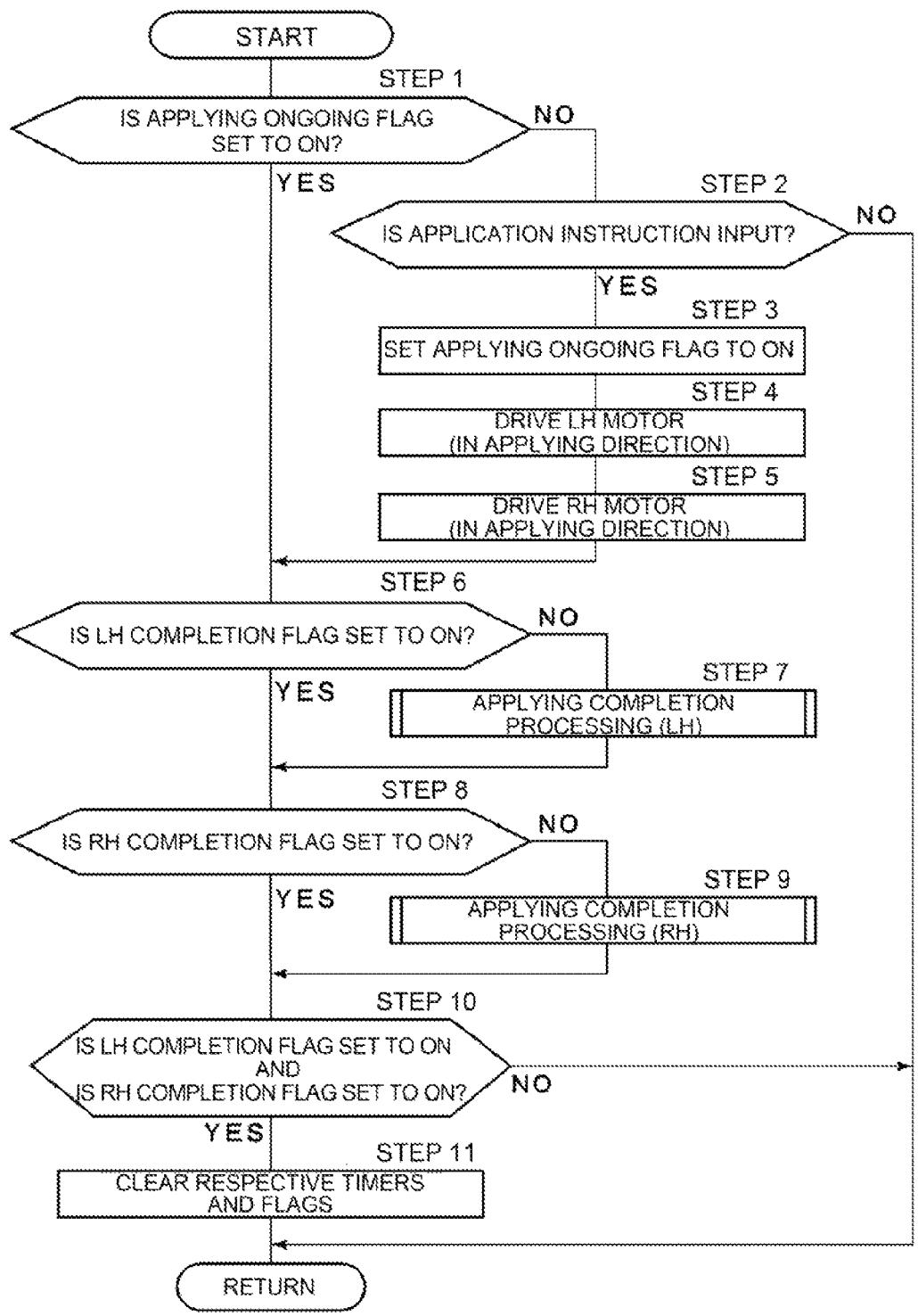
FIG. 3 is a flowchart illustrating control processing by a parking brake controller illustrated in FIG. 1.

Upon a start of the processing operation illustrated in FIG. 3, in step 1, the parking brake controller 20 determines whether an applying ongoing flag is set to ON. If the parking brake controller 20 determines "NO", i.e., the disk brake 31 is not in an applying ongoing state (the disk brake 31 is not being applied) in step 1, the control processing proceeds to step 2. On the other hand, if the parking brake controller 20 determines "YES", i.e., the disk brake is in the applying ongoing state (the disk brake is being applied) in step 1, the control processing proceeds to step 6.

In step 2, the parking brake controller 20 determines whether the application instruction, i.e., the parking brake request signal is input from the parking brake switch 19 or the like. If the parking brake controller 20 determines "NO", i.e., determines that no application instruction is input in step 2, the control processing returns to "START" step via "RETURN" step. In this case, the control processing proceeds from "START" step to step 1 after a predetermined time period has elapsed. On the other hand, if the parking brake controller 20 determines "YES", i.e., determines that the application instruction is input in step 2, the control processing proceeds to step 3.

In step 3, the parking brake controller 20 sets the applying ongoing flag to ON based on the YES determination made in step 2. In subsequent steps, steps 4 and 5, the parking brake controller 20 drives the respective electric actuators 43 mounted on the rear left and right wheels 3 in directions that cause the linearly movable members 42 (the pistons 39) to move toward the disk rotors 4 (in the applying directions).

In the following description, for convenience of the description, the motor of the electric actuator 43 for the rear left (RL) wheel 3 will be referred to as an LH motor, and the motor of the electric actuator 43 for the rear right (RR) wheel 3 will be referred to as an RH motor.

In step 6, the parking brake controller 20 determines whether an LH completion flag is set to ON. If the parking brake controller 20 determines "YES", i.e., determines that the LH completion flag is set to ON in step 6, the control processing proceeds to step 8. On the other hand, if the parking brake controller 20 determines "NO", i.e., determines that the LH completion flag is set to OFF in step 6, the control processing proceeds to step 7. In step 7, the parking brake controller 20 performs applying completion processing illustrated in FIG. 4 on the LH motor.

In step 8, the parking brake controller 20 determines whether an RH completion flag is set to ON. If the parking brake controller 20 determines "YES", i.e., determines that the RH completion flag is set to ON in step 8, the control processing proceeds to step 10. On the other hand, if the parking brake controller 20 determines "NO", i.e., determines that the RH completion flag is set to OFF in step 8, the control processing proceeds to step 9. In step 9, the parking brake controller 20 performs the applying completion processing illustrated in FIG. 4 on the RH motor.

In step 10, the parking brake controller 20 determines whether the LH completion flag is set to ON, and the RH completion flag is set to ON. If the parking brake controller 20 determines "YES", i.e., determines that the both the LH completion flag and the RH completion flag are set to ON in step 10, the control processing proceeds to step 11. In step 11, the parking brake controller 20 clears respective timers (an LH timer and an RH timer) and the respective flags (the applying ongoing flag, the LH completion flag, and the RH completion flag). In other words, the parking brake controller 20 sets the respective times to zero, and sets the respective flags to OFF. After completion of step 11, the control processing returns to "START" step via "RETURN" step.

On the other hand, if the parking brake controller 20 determines "NO", i.e., determines that at least one of the LH completion flag and the RH completion flag is set to OFF in step 10, the control processing returns to "START" step via "RETURN" step while skipping step 11. Then, the determination processing is executed every a predetermined time until both of the LH completion flag and the RH completion flag are set to ON.

Next, the applying completion processing in steps 7 and 9 will be described. Since the respective LH motor and RH motor are subjected to the same processing as described above, this processing will be described with reference to FIG. 4, especially focusing on the processing performed on the LH motor.

Upon a start of the applying completion processing illustrated in FIG. 4, in step 21, the LH timer (the RH timer for the RH motor) starts measuring an elapsed time period. In a subsequent step, step 22, the parking brake controller 20 determines whether a predetermined time period T has elapsed (the value measured by the LH timer reaches or exceeds the predetermined time period T1) since the LH timer starts measuring an elapsed time period, i.e., the parking brake controller 20 starts driving the electric actuator 43. If the parking brake controller 20 determines "NO", i.e., determines that the value measured by the LH timer does not reach the predetermined time period T1 in step 22, the processing proceeds to step 8 illustrated in FIG. 3 (step 10 for the RH motor) via "RETURN" step. On the other hand, if the parking brake controller 20 determines "YES", i.e., determines that the value measured by the LH timer reaches the predetermined time period T1 in step 22, the processing proceeds to step 23. The predetermined time period T1 is set so as to be longer than a time taken until an inrush current generated immediately after a start of power supply to the LH motor (the RH motor for the rear right wheel 3) reaches or falls below a predetermined value (a lower limit value) Amin. In this manner, the present embodiment causes the parking brake controller 20 to determine whether the predetermined time period T1 has elapsed since the parking brake controller 20 starts driving the electric actuator 43, thereby succeeding in preventing the parking brake controller 20 from making an incorrect determination based on the current threshold value, which otherwise might occur due to the inrush current.

In step 23, the LH motor is subjected to the P information acquisition processing illustrated in FIG. 5, and then the processing proceeds to step 24. In step 24, the parking brake controller 20 sets the predetermined value A1, which is the target current value, with use of the acquired hydraulic pressure P based on a characteristic 51 indicated by a solid line illustrated in FIG. 6.

The pressing force in the caliper 34 shows the following characteristic when the hydraulic pressure P is supplied into the caliper 34. The pressing force F exerted on the brake pads 33 that sandwiches the disk rotor 4 is expressed as a sum of a load generated from a forward movement of the piston 39 caused by the hydraulic pressure P (a load from the hydraulic pressure), and a load generated from a forward movement of the linearly movable member 42 caused by the electric actuator 43 (a load from the electric actuator) (refer to "PRESSING FORCE F EXERTED ON PAD" from time a8 to time a9 on a temporal axis illustrated in FIG. 8)

In this case, as the pressing force in the caliper 34, both the load from the hydraulic pressure and the load from the electric actuator are imposed on not only the brake pad 33 but also the bridge portion 37, the claw portion 38, and the like. On the other hand, only the load from the electric actuator is imposed on the rotation-linear motion conversion mechanism 40.

Next, upon a release of the hydraulic pressure P in the caliper 34, the brake pad 33, the bridge portion 37, the claw portion 38, and the like are displaced until a balanced relationship is established between the load imposed on the portions (the brake pad 33, the bridge portion 37, the claw portion 38, and the like) displaced (deformed) by both the load from the hydraulic pressure and the load from the electric actuator, and the load imposed on the portion (the rotation-linear motion conversion mechanism 40) displaced by only the load from the electric actuator. In other words, the load imposed on the brake pad 33 decreases compared to the load before the release of the hydraulic pressure P in the caliper 34 but the load imposed on the rotation-linear motion conversion mechanism 40 increases. Therefore, if the disk brake 31 starts to be applied with the hydraulic pressure P added into the caliper 34, the pressing force F exerted on the brake pad 33 becomes stronger than the pressing force generated only by the electric actuator 43 (refer to the pressing force F at time a9 and the pressing force F at time a10 on the temporal axis illustrated in FIG. 8).

Accordingly, an ideal (static) relationship between the hydraulic pressure P and the predetermined value A1 as the target current value can be expressed as a straight line connecting a point 53 where P is equal to zero and A1 is equal to Amax, and a point 54 where P is equal to P1 and A1 is equal to zero, like a characteristic 52 indicated by a dotted line illustrated in FIG. 6, provided that the target pressing force is set to be constant. However, in the present embodiment, the predetermined value A1 is set in such a manner that A1 is constantly equal to Amax within a range where the hydraulic pressure P is from zero to P0, and shifts in parallel with the characteristic 52 in a range where the hydraulic pressure P is equal to or higher than P0, as indicated by a characteristic 51. In this manner, the present embodiment can acquire the target pressing force while compensating for various kinds of dynamic delays of the hydraulic pressure P (a delay in detection due to the responsiveness of the pressure sensor that detects the hydraulic pressure P, a delay in communication due to the vehicle data bus 16, and a delay in calculation by the electronic device that estimates the hydraulic pressure P, such as the control unit 13 of the ESC 11 and the parking brake controller 20), by adding an offset P0 to the shift of the predetermined value A1. Conversely, the offset P0 can be set so as to correspond to the delay in the hydraulic pressure P (a delay in the detection signal, and a delay in the calculation). In other words, the characteristic 51 is set by adding a pressing force corresponding to the delay in the hydraulic pressure P to the characteristic 52, and the target pressing force (the target current value A1) is changed based on this characteristic 51.

Further, a lower limit value Amin is set to the characteristic 51 for calculating the target current value (the predetermined value) A1. This lower limit value Amin, i.e., the minimum value of the target current value A1 is set to a larger value than a current value when the LH motor (the RH motor for the rear right wheel 3) is driven with no load imposed thereon (A2 of "CURRENT OF ELECTRIC ACTUATOR" illustrated in FIG. 8). As a result, the present embodiment can ensure that the linearly movable member 42 never fails to be thrust (actuated) until it contacts the piston 39. The target pressing force (the target current value A1) may be changed according to, for example, an inclination of a road surface where the vehicle is parked. For example, the target pressing force may be changed so as to decrease as the road surface is less inclined. In this case, Amax and P1 can be corrected according to how the road surface is inclined.

In a subsequent step, step 25, the parking brake controller 20 acquires the current value IM of the electric actuator (a current value IML of the LH motor for the rear left wheel 3, and a current value IMR of the RH motor for the rear right wheel 3). The parking brake controller 20 can detect this current value IM (IM information) with use of the current sensor (not illustrated) provided to the parking brake controller 20. Then, in step 26, the parking brake controller 20 determines whether the current value IM (IML or IMR) detected by the parking brake controller 20 is maintained at or over the predetermined value A1 for a predetermined time period T2. If the parking brake controller 20 determines "NO", i.e., determines that the current value IM is not maintained at or over the predetermined value A1 for the predetermined time period T2 in step 26, the processing proceeds to step 8 (for the LH motor) or step 10 (for the RH motor) illustrated in FIG. 3 via "RETURN" step illustrated in FIG. 4. On the other hand, if the parking brake controller 20 determines "YES", i.e., determines that the current value IM is maintained at or over the predetermined value A1 for the predetermined time period T2 in step 26, the processing proceeds to step 27, in which the parking brake controller 20 stops the electric actuator (the LH motor for the rear left wheel 3 and the RH motor for the rear right wheel 3). Then, in step 28, the parking brake controller 20 sets the completion flag (the LH completion flag for the rear left wheel 3, and the RH completion flag for the rear right wheel 3) to ON.

The processing proceeds to step 8 (for the LH motor) or step 10 (for the RH motor) illustrated in FIG. 3 via "RETURN" step illustrated in FIG. 4.

Next, the P information acquisition processing in step 23 will be described. Both the LH motor and the RH motor are subjected to the same processing, whereby this processing will be described with reference to FIG. 5, especially focusing on the processing performed on the LH motor.

Upon a start of the P information acquisition processing illustrated in FIG. 5, in step 31, the parking brake controller 20 determines whether normal information is acquired as information that indicates the pipe inner pressure of the brake-side pipe portion 12D of the rear left wheel 3 (12C for the rear right wheel 3), i.e., the W/C hydraulic pressure PW/C detected by the W/C pressure sensor 17, which can be acquired from the vehicle data bus 16. If the parking brake controller 20 determines "NO", i.e., determines that an abnormal value (a value deviating from a predetermined range) is acquired as the W/C hydraulic pressure PW/C information due to, for example, a malfunction of the W/C pressure sensor 17 or a disconnection in step 31, the processing proceeds to step 33. On the other hand, if the parking brake controller 20 determines "YES", i.e., determines that the W/C hydraulic pressure PW/C information is normal in step 31, in step 32, the parking brake controller 20 inputs the acquired W/C hydraulic pressure PW/C as the hydraulic pressure P. Then, the processing proceeds to step 24 illustrated in FIG. 4 via "RETURN" step illustrated in FIG. 5.

Next, in step 33, the parking brake controller 20 determines whether normal information is acquired as information that indicates the pipe inner pressure of at least one of the cylinder-side hydraulic pipes 10A and 10B, i.e., the M/C hydraulic pressure PM/C detected by the M/C pressure sensor 18, which can be acquired from the vehicle data bus 16. If the parking brake controller 20 determines "NO", i.e., determines that an abnormal value is acquired as the M/C hydraulic pressure PM/C information due to, for example, a malfunction of the M/C pressure sensor 18 or a disconnection in step 33, the processing proceeds to step 35. On the other hand, if the parking brake controller 20 determines "YES", i.e., determines that the M/C hydraulic pressure PM/C information is normal in step 33, in step 34, the parking brake controller 20 inputs the acquired M/C hydraulic pressure PM/C as the hydraulic pressure P. Then, the processing proceeds to step 24 illustrated in FIG. 4 via "RETURN" step illustrated in FIG. 5. These steps correspond to a procedure when the M/C hydraulic pressure PM/C and the hydraulic pressure P in the caliper 34 have an equivalent relationship (1:1) therebetween, such as a procedure when the ESC 11 is out of operation (the ESC 11 is not driven). When the ESC 11 is driven, for example, the processing may directly proceed to step 35 while skipping the process of step 33.

In step 35, the parking brake controller 20 determines whether normal information is acquired as the information (the state amount) that allows the hydraulic pressure P in the caliper 34 to be estimated, i.e., the P estimation allowable information S, which will be described below. The P estimation allowable information S can be acquired from the vehicle data bus 16. If the parking brake controller 20 determines "NO", i.e., determines that an abnormal value is acquired as the information S due to, for example, a malfunction of the sensor that detects the state amount corresponding to the information S or a disconnection in step 35, the processing proceeds to step 37. In step 37, the parking brake controller 20 inputs P=0, and then the processing proceeds to step 24 illustrated in FIG. 4 via "RETURN" step illustrated in FIG. 5. On the other hand, if the parking brake controller 20 determines "YES", i.e., determines that the information S is normal in step 35, in step 36, the parking brake controller 20 inputs a value estimated from the information S (an estimated value) as the hydraulic pressure P, and then the processing proceeds to step 24 illustrated in FIG. 4 via "RETURN" step illustrated in FIG. 5.

In the above-described step, step 37, the hydraulic pressure P is set to zero, which ensures that a pressing force required for the parking brake is generated even when a failure occurs at the various kinds of sensors. However, a larger value than P0 may be input as the hydraulic pressure P instead of zero, if the disk brake 31 has a function of applying the parking brake again, for example, upon detecting that the wheel speed is higher than zero, i.e., the vehicle starts running. In this case, if the pressing force required to keep the vehicle parked cannot be acquired so that the vehicle starts running, upon detecting that, the parking brake controller 20 can increase the pressing force in the next applying operation (the next control cycle) by inputting a smaller value than the value input in the first applying operation (or in the immediately preceding control cycle) as the hydraulic pressure P.

Figure 7:
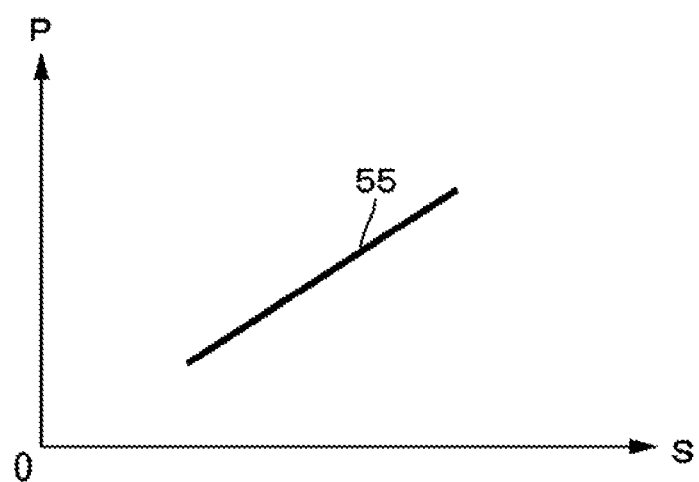
FIG. 7 is a characteristic diagram illustrating an example of a relationship between information S for estimating the hydraulic pressure P, and the hydraulic pressure P.

Further, the above-described P information estimation allowable information S may be, for example, an amount detected by the stroke sensor provided to the booster 7 (a stroke amount), or an amount detected by the brake operation detection sensor 6A provided to the brake pedal 6 (a stroke amount if this sensor is a stroke sensor, and a pressing force if this sensor is a pressing force sensor). Alternatively, if an electric actuator is used as the booster 7, the P information estimation allowable information S may be a current value or an operation amount (a stroke) of this electric actuator. A relationship between the P information estimation allowable information S and the hydraulic pressure P estimated from the P information estimation allowable information S may be set so as to monotonously increase, as indicated by a characteristic 55 illustrated in FIG. 7. Conversely, a state amount (a physical amount) monotonously increasing proportionally to the hydraulic pressure P may be used as the P information estimation allowable information S.

The present embodiment has been described based on the example in which the W/C hydraulic pressure PW/C information can be acquired from the vehicle data bus 16. If this information cannot be acquired from the vehicle data bus 16, the P information acquisition processing illustrated in FIG. 5 may start from the determination about the M/C hydraulic pressure PM/C information in step 33. Further, if the M/C hydraulic pressure PM/C information is determined to be used as the hydraulic pressure P, the acquired M/C hydraulic pressure PM/C information may be directly used as the hydraulic pressure P, as long as the ESC 11 located on the downstream side of the M/C pressure sensor 18 is out of operation (stops the control). However, the ESC 11 may perform control of keeping the vehicle parked even when the hydraulic pressure in the master cylinder 8 is zero, by closing electromagnetic valves (not illustrated) in the ESC 11 to maintain the pipe inner pressures in the brake-side pipe portions 12A, 12B, 12C, and 12D, such as the hill start aid control. In this case, the parking brake controller 20 may detect that the ESC 11 is performing control through communication via the vehicle data bus 16, and input a peak value of the M/C hydraulic pressure PM/C detected during this control as the hydraulic pressure P. Further, if the ESC 11 performs control of not maintaining the hydraulic pressure equal to or higher than the predetermined maximum value (Pmax), the parking brake controller 20 may compare the M/C hydraulic pressure PM/C and the maximum value Pmax, and set the hydraulic pressure P in such a manner that the hydraulic pressure P becomes equal to the M/C hydraulic pressure PM/C if the M/C hydraulic pressure PM/C is lower than the maximum value Pmax while setting the hydraulic pressure P in such a manner that the hydraulic pressure P becomes equal to the maximum value Pmax if the M/C hydraulic pressure PM/C is equal to or higher than the maximum value Pmax.

In any case, while the ESC 11 is performing control, the parking brake controller 20 can detect or estimate the hydraulic pressure P based on a detection value of another detector that detects an operation state of the ESC 11 than the M/C pressure sensor 18, such as the pressure sensor in the ESC 11 or a sensor that detects whether the electromagnetic valves in the ESC 11 are opened or closed. Further, while the ESC 11 is performing control, the parking brake controller 20 may invalidate detection by the M/C pressure sensor 18, and may instead use a result detected by the W/C pressure sensor 17, which is another sensor than the M/C pressure sensor 18.

Figure 8:
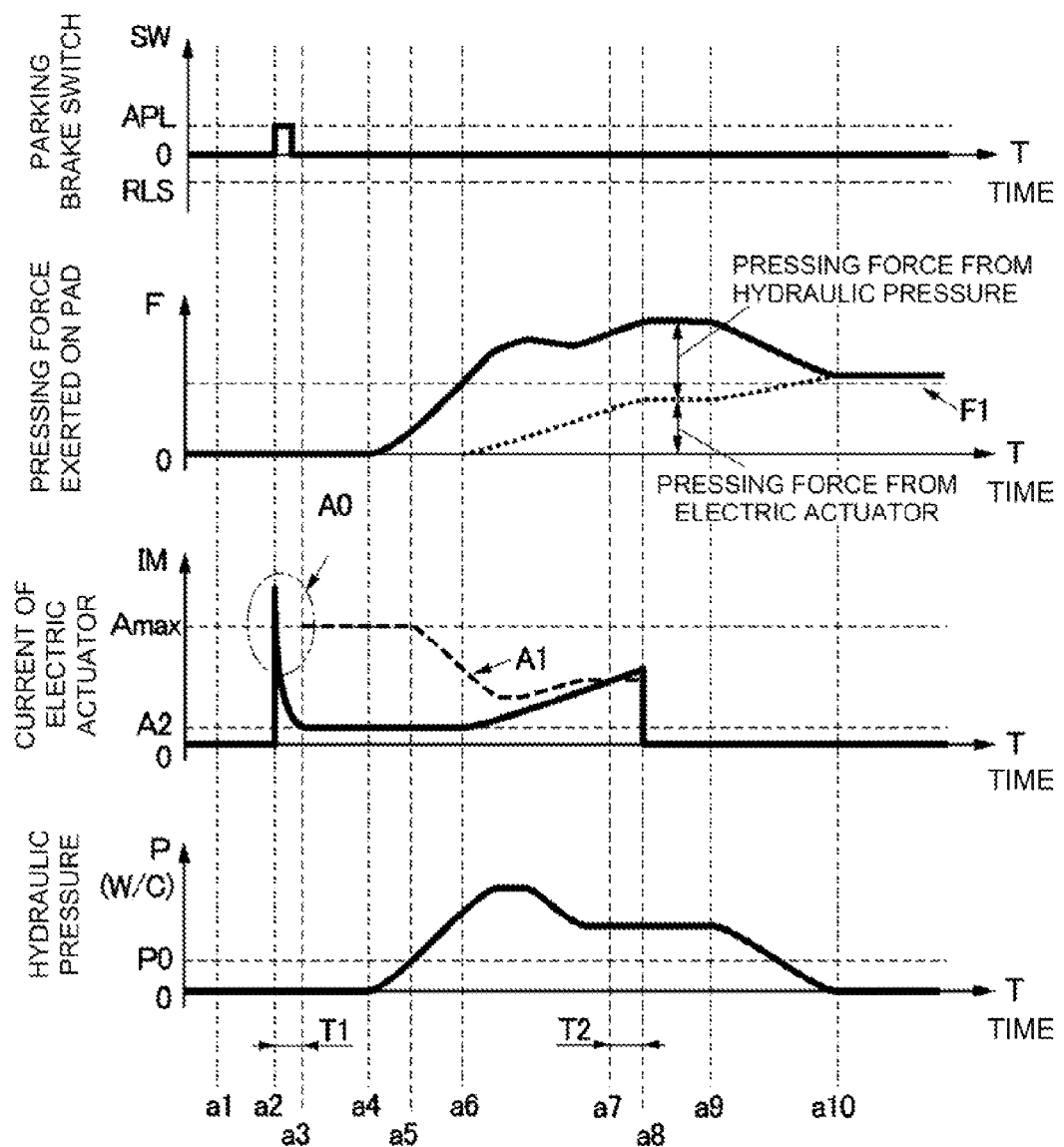
FIG. 8 is a characteristic diagram illustrating examples of temporal changes in a parking brake switch (SW), a pressing force (F) exerted on a pad, a current (IM) of an electric actuator, and the hydraulic pressure P in a wheel cylinder (W/C) when the parking brake is actuated.

Next, a time chart when the parking brake controller 20 performs the processing illustrated in FIGS. 3 to 5 will be described with reference to FIG. 8. Since the LH motor and the RH motor perform the same control processing, this time chart will be described based on the LH motor by way of example. FIG. 8 illustrates respective temporal changes in an operation performed on the parking brake switch 19 (SW), the pressing force F exerted on the brake pad 33, the current IM of the electric actuator 43, and the W/C pressure (the W/C hydraulic pressure PW/C) corresponding to the hydraulic pressure P added into the caliper 34. Suppose that, in the example illustrated in FIG. 8, the predetermined value A1 is set so as to be able to acquire the pressing force F stronger than the target pressing force F1.

At time a1 on the temporal axis, the application instruction (APL) is not input from the parking brake switch 19 so that the electric actuator 43, i.e., the LH motor is stopped and the current IM (IML) is zero. Upon an input of the application instruction from the parking brake switch 19 (the parking brake controller 20 determines YES in step 2) at time a2 on the temporal axis, the parking brake controller 20 starts supplying power to the electric actuator (the LH motor) to move the linearly movable member 42 toward the disk rotor 4 (step 4). At this time, the electric actuator 43 (the LH motor) shifts from a stopped state to a driven state so that a large inrush current (A0) is instantaneously generated. After that, the current IM decreases, and then becomes constant. The parking brake controller 20 refrains from making a determination with use of the current IM during the predetermined time period T1 from time a2 to time a3 on the temporal axis to avoid an incorrect determination due to this inrush current (A0) (step 22).

After the predetermined time period T1 has elapsed, the parking brake controller 20 starts a determination by comparing the predetermined value A1 and the current IM of the LH motor (step 26). Suppose that the W/C hydraulic pressure PW/C starts increasing due to an operation that the driver performs on the brake pedal 6 at time a4 on the temporal axis. Then, once the W/C hydraulic pressure PW/C exceeds P0 at time a5 on the temporal axis, the parking brake controller 20 corrects the target current value A1 according to the characteristic illustrated in FIG. 6 in such a manner that the target current value (the predetermined value) A1 decreases (step 24). At this time, only the pressing force from the hydraulic pressure is exerted on the brake pad 33 and no pressing force from the electric actuator is exerted on the brake pad 33.

On the other hand, when the driving of the LH motor displaces the linearly movable member 42 into abutment with the piston 39 so that a thrust force is generated by the rotation-linear motion conversion mechanism 40, the current IM of the LH motor starts increasing gradually (time a6 on the temporal axis). At this time, the pressing force F exerted on the brake pad 33 is a sum of the pressing force from the hydraulic pressure and the pressing force from the electric actuator. Then, the current IM reaches and exceeds the target current value (the predetermined value) A1 at time a7 on the temporal axis, and a time period during which the current IM is maintained equal to or higher than the target current value A1 reaches the predetermined time period T2 at time a8 on the temporal axis. Then, the power supply to the LH motor is stopped at time a8 (step 27), and the electric actuator 43 of the rear left wheel 3 (RL) completes being applied. At this time, since the W/C hydraulic pressure PW/C is higher than P0, the target current value (the predetermined value) A1 is set to a smaller value than the maximum value Amax (refer to FIG. 6). As a result, the pressing force from the electric actuator 43 falls below the target pressing force F1.

After that, the W/C hydraulic pressure PW/C decreases from time a9 on the temporal axis in response to an operation performed on the brake pedal 6 by the driver. When the W/C hydraulic pressure PW/C decreases to zero at time a10, the load from the hydraulic pressure becomes zero, but the load from the electric actuator, i.e., the load imposed on the rotation-linear motion conversion mechanism 40 increases as described above. As a result, the pressing force F exerted on the brake pad 33 is maintained stronger than the target pressing force F1 at time a10 on the temporal axis.

As described above, the present embodiment can prevent the parking brake from generating an excessive or insufficient braking force.

In other words, after driving the electric actuator 43 (the LH motor and the RH motor), in response to a change in the hydraulic pressure P in the caliper 34 of the disk brake 31 (the W/C hydraulic pressure PW/C, the M/C hydraulic pressure PM/C, or the information S that allows the hydraulic pressure P to be estimated), the parking brake controller 20 changes the target current value A1 corresponding to the target pressing force according to this change in the hydraulic pressure P. In other words, the target current value A1 (i.e., the target pressing force) continues to vary so as to follow the hydraulic pressure P (refer to time a2 to time a8 on the temporal axis illustrated in FIG. 8) during one operation of the electric actuator 43 (i.e., a period from a start of power supply to the electric actuator 43 to a stop thereof). For example, if the hydraulic pressure P increases during a time period since the parking brake controller 20 starts driving the electric actuator 43 until the current value of the electric actuator 43 reaches the target current value A1, the parking brake controller 20 sets the target current value A1 to a smaller value according to this change. On the other hand, if the hydraulic pressure P decreases, the parking brake controller 20 sets the target current value A1 to a larger value according to this change. As a result, even with a change in the hydraulic pressure P while the parking brake controller 20 drives the electric actuator 43, the parking brake controller 20 can end the driving of the electric actuator 43 (establish the brake holding state) while acquiring the target current value A1 according to this change in the hydraulic pressure P. Therefore, the present embodiment can prevent the parking brake from generating an excessive or insufficient braking force.

According to the present embodiment, the parking brake controller 20 calculates a change in the hydraulic pressure P based on a signal from the W/C pressure sensor 17 that detects the hydraulic pressure in the caliper 34 (the cylinder portion 36). Therefore, the parking brake controller 20 can change the target current value A1 according to a change in the wheel cylinder pressure (the W/C pressure) directly corresponding to the hydraulic pressure P in the caliper 34, i.e., the W/C hydraulic pressure PW/C. As a result, the parking brake controller 20 can set this target current value A1 to an appropriate value according to the hydraulic pressure P.

According to the present embodiment, the parking brake controller 20 can also calculate a change in the hydraulic pressure P based on a signal from the M/C pressure sensor 18 that detects the hydraulic pressure to be supplied into the caliper 34 (the cylinder portion 36). Therefore, the parking brake controller 20 can change the target current value A1 according to a change in the master cylinder pressure (the M/C pressure) directly or indirectly corresponding to the hydraulic pressure P in the caliper 34, i.e., the M/C hydraulic pressure PM/C. As a result, the parking brake controller 20 can set this target current value A1 to an appropriate value according to the hydraulic pressure P.

According to the present embodiment, the ESC 11 is disposed between the disk brake 31 and the master cylinder 8, and this ESC 11 is configured to be able to supply a hydraulic pressure to the disk brake 31 (into the caliper 34) even in a different manner from supplying a hydraulic pressure according to an amount of an operation performed on the brake pedal 6. Then, if the parking brake controller 20 starts driving the electric actuator 43 (the LH motor and the RH motor) while the ESC 11 is in operation, the parking brake controller 20 is configured to be able to detect or estimate the hydraulic pressure P based on a detection value of another detector that detects the operation state of the ESC 11 than the M/C pressure sensor 18 (for example, the pressure sensor in the ESC 11, or the sensor that detects whether the electromagnetic valves in the ESC 11 are opened or closed). Therefore, the parking brake controller 20 can change the target current value A1 according to the operation state of the ESC 11 that affects the hydraulic pressure P in the caliper 34. As a result, the parking brake controller 20 can set this target current value A1 to an appropriate value according to the hydraulic pressure P.

According to the present embodiment, the parking brake controller 20 is configured to change the target current value A1 by adding the pressing force corresponding to the delay in calculation of a detection signal of the hydraulic pressure P, as indicated by the characteristic 51 illustrated in FIG. 6. Therefore, even when it takes a certain time since detection of a change in the hydraulic pressure P until calculation of the target current value A1 according to this change in the hydraulic pressure P (even with the delay in the calculation), the parking brake controller 20 can add the pressing force corresponding to this time (delay) to the target current value A1 in advance. This can prevent the pressing force from decreasing according to the delay until the calculation of the target current value A1.

According to the present embodiment, the electric actuator 43 (the electric motor) is used as an electric mechanism, and the target pressing force is set according to the target current value A1, which is the current threshold value for stopping driving the electric actuator 43. Therefore, the parking brake controller 20 can accurately stop driving the electric actuator 43 (establish the brake holding state) when the disk brake 31 is placed into a state that allows it to acquire the target pressing force, based on the current IM of the electric actuator 43.

According to the present embodiment, the target current value A1 is set so as to increase as the hydraulic pressure P decreases. Therefore, the parking brake controller 20 can stop driving the electric actuator 43 according to a strong target pressing force when the hydraulic pressure P is low. As a result, the present embodiment can prevent the parking brake from generating an insufficient braking force. On the other hand, the parking brake controller 20 can stop driving the electric actuator 43 according to a weak target pressing force when the hydraulic pressure P is high. As a result, the present embodiment can prevent the parking brake from generating an excessive braking force.

According to the present embodiment, the minimum value of the target current value A1 is set to a larger value than the current value A2 when the electric actuator 43 is driven with no load applied to the electric actuator 43. Therefore, even when the hydraulic pressure P is high, the parking brake controller 20 stops driving the electric actuator 43 with a load imposed on the electric actuator 43 (with the linearly movable member 42 in contact with the piston 39). As a result, the present embodiment can prevent the parking brake from generating an insufficient braking force because the parking brake controller 20 stops driving the electric actuator 43 before a load starts to be imposed on the electric actuator 43 (before the linearly movable member 42 starts contacting the piston 39).

The above-described embodiment has been described based on the example in which the disk brake 31 equipped with the electric parking brake is used as each of the brakes for the rear left and right wheels. However, the present invention is not limited thereto. For example, the disk brake equipped with the electric parking brake may be used as each of the brakes for the front left and right wheels. Further, the disk brake equipped with the electric parking brake may be used as each of brakes for all of the four wheels.

Further, the above-described embodiment has been described based on the hydraulic disk brake 31 equipped with the electric parking brake, which exerts the pressing force based on the two mechanisms, the hydraulic mechanism as the brake in normal use and the electric mechanism as the parking brake, by way of example. However, an embodiment of the present invention is not limited to the above-described disk brake 31, and the present invention can be widely employed for various types of brake apparatuses that exert the pressing force based on the two mechanisms, the hydraulic mechanism as the brake in normal use and the electric mechanism as the parking brake.

For example, a brake apparatus according to an embodiment of the present invention may be configured as not only the disk brake type brake apparatus that exerts a braking force based on frictional engagement between the disk and the brake pad but also a drum brake type brake apparatus that exerts a braking force based on frictional engagement between a drum and a brake shoe. Further, a brake apparatus according to an embodiment of the present invention may be configured as, for example, a brake apparatus that actuates the parking brake by pulling a cable attached to a parking brake mechanism of the brake apparatus by an electric mechanism.

According to the above-described embodiment, upon a change in the hydraulic pressure of the brake apparatus after the controller starts driving the electric mechanism, the controller changes the target pressing force according to this change in the hydraulic pressure. For example, if the hydraulic pressure increases since the controller starts driving the electric mechanism until the target pressing force is acquired, the controller sets the target pressing force to a weaker force according to this change. On the other hand, if the hydraulic pressure decreases, the controller sets the target pressing force to a stronger force according to this change. As a result, even with a change in the hydraulic pressure P while the controller drives the electric actuator, the controller can end the driving of the electric actuator (establish the brake holding state) while acquiring the target current value according to this change in the hydraulic pressure. Therefore, the above-described embodiment can prevent the parking brake from generating an excessive or insufficient braking force.

According to the above-described embodiment, the controller is configured to calculate a change in the hydraulic pressure in the brake apparatus based on a signal from the master cylinder pressure sensor that detects the hydraulic pressure to be supplied to the brake apparatus. Therefore, the controller can change the target current value of the electric mechanism according to a change in the master cylinder pressure (M/C pressure) directly or indirectly corresponding to the hydraulic pressure in the brake apparatus according to a situation. As a result, the controller can set this target current value to an appropriate value according to the hydraulic pressure in the brake apparatus.

According to the above-described embodiment, the controller is configured to calculate a change in the hydraulic pressure in the brake apparatus based on a signal from the wheel cylinder pressure detector that detects the hydraulic pressure in the brake apparatus. Therefore, the controller can change the target current value of the electric mechanism according to a change in the wheel cylinder pressure (the W/C pressure) directly corresponding to the hydraulic pressure in the brake apparatus. As a result, the controller can set this target current value to an appropriate value according to the hydraulic pressure in the brake apparatus.

According to the above-described embodiment, the hydraulic control mechanism is disposed between the brake apparatus and the hydraulic source, and this hydraulic control mechanism is configured to be able to supply a hydraulic pressure to the brake apparatus even in a different manner from supplying a hydraulic pressure according to an amount of an operation performed on the brake pedal. Then, if the controller starts driving the electric mechanism while the hydraulic control mechanism is in operation, the controller is configured to estimate the hydraulic pressure in the brake apparatus based on a detection value of another detector that detects the operation state of the hydraulic control mechanism than the master cylinder pressure sensor. Therefore, the controller can detect a change in the hydraulic pressure in an appropriate manner according to the operation state of the hydraulic control mechanism, and change the target current value of the electric mechanism based on the detected change in the hydraulic pressure. As a result, the controller can set this target current value to an appropriate value according to the hydraulic pressure in the brake apparatus.

According to the above-described embodiment, the controller is configured to change the target current value A1 by adding the pressing force corresponding to the delay in calculation of a detection signal of the hydraulic pressure. Therefore, even when it takes a certain time since detection of a change in the hydraulic pressure until calculation of the target current value according to this change in the hydraulic pressure (even with a delay in the calculation), the controller can add the pressing force corresponding to this time (delay) to the target current value in advance. This can prevent the pressing force from decreasing according to the delay until the calculation of the target current value.

According to the above-described embodiment, the electric motor is used as the electric mechanism, and the target pressing force corresponds to the current threshold value for stopping driving the electric motor. Therefore, the controller can accurately stop driving the electric motor (establish the brake holding state) when the brake apparatus is placed into a state that allows it to acquire the target pressing force, based on the value of the current (the current value) of the electric motor.

According to the above-described embodiment, the current threshold value is set so as to increase as the hydraulic pressure in the brake apparatus decreases. Therefore, the controller can stop driving the electric motor (establish the brake holding state) according to a strong target pressing force when the hydraulic pressure in the brake apparatus is low. As a result, the above-described embodiment can prevent the parking brake from generating an insufficient braking force. On the other hand, the controller can stop driving the electric motor (establish the brake holding state) according to a weak target pressing force when the hydraulic pressure in the brake apparatus is high. As a result, the above-described embodiment can prevent the parking brake from generating an excessive braking force.

According to the above-described embodiment, the current threshold value is set to a larger value than the current value when the electric motor is driven with no load imposed on the electric motor. Therefore, even when the hydraulic pressure is high, the controller stops driving the electric motor with a load imposed on the electric motor. As a result, the above-described embodiment can prevent the parking brake from generating an insufficient braking force because the controller stops driving the electric motor before a load starts to be imposed on the electric motor.

What is claimed is:

1. A brake system comprising:
   a brake apparatus configured to keep a vehicle braked by an electric mechanism in response to a parking brake request signal, and brake the vehicle by supply of a hydraulic pressure from a hydraulic source in response to an operation performed on a brake pedal; and
   a controller configured to drive the electric mechanism until a target pressing force is acquired to establish a brake holding state in response to the parking brake request signal,
   wherein the controller is configured to repeatedly change the target pressing force according to a change in a hydraulic pressure in the brake apparatus, in response to the parking brake request signal, after starting driving the electric mechanism and until the target pressing force is acquired.

2. The brake system according to claim 1, wherein the controller calculates the change in the hydraulic pressure in the brake apparatus based on a signal from a master cylinder pressure detector for detecting the hydraulic pressure to be supplied to the brake apparatus.

3. The brake system according to claim 1, wherein the controller calculates the change in the hydraulic pressure in the brake apparatus based on a signal from a wheel cylinder pressure detector for detecting the hydraulic pressure in the brake apparatus.

4. The brake system according to claim 2, further comprising a hydraulic controller disposed between the brake apparatus and the hydraulic source, the hydraulic controller being configured to supply the hydraulic pressure to the brake apparatus in a different manner from supplying the hydraulic pressure according to an amount of the operation performed on the brake pedal, wherein the controller estimates the change in the hydraulic pressure in the brake apparatus based on a detection value of another detector that detects an operation state of the hydraulic controller than the master cylinder pressure detector, if the controller starts driving the electric mechanism while the hydraulic controller is in operation.

5. The brake system according to claim 2, wherein the controller changes the target pressing force by adding a pressing force corresponding to a delay in calculation of the signal for detecting the hydraulic pressure.

6. The brake system according to claim 1, wherein the electric mechanism is an electric motor, and wherein the target pressing force corresponds to a current threshold value for stopping driving the electric motor.

7. The brake system according to claim 6, wherein the current threshold value is set so as to increase as the hydraulic pressure in the brake apparatus decreases.

8. The brake system according to claim 6, wherein the current threshold value is set so as to be maintained at a larger value than a current value when the electric motor is driven with no load imposed on the electric motor.

9. The brake system according to claim 6, wherein the current threshold value is set so as to become equal to a predetermined maximum value within a range of the hydraulic pressure in the brake apparatus from zero to a predetermined value.

10. A brake system comprising:
a brake apparatus configured to keep a vehicle braked by an electric mechanism in response to a parking brake request signal, and brake the vehicle by supply of a hydraulic pressure from a hydraulic source in response to an operation performed on a brake pedal; and
a controller configured to drive the electric mechanism until a target pressing force is acquired to establish a brake holding state in response to the parking brake request signal,
wherein the controller is configured to change the target pressing force according to a change in a hydraulic pressure in the brake apparatus after starting driving the electric mechanism in response to the parking brake request signal, and
wherein the controller calculates the change in the hydraulic pressure in the brake apparatus based on a signal from a master cylinder pressure detector for detecting the hydraulic pressure to be supplied to the brake apparatus.

11. The brake system according to claim 10, further comprising a hydraulic controller disposed between the brake apparatus and the hydraulic source, the hydraulic controller being configured to supply the hydraulic pressure to the brake apparatus in a different manner from supplying the hydraulic pressure according to an amount of the operation performed on the brake pedal, wherein the controller estimates the change in the hydraulic pressure in the brake apparatus based on a detection value of another detector that detects an operation state of the hydraulic controller than the master cylinder pressure detector, if the controller starts driving the electric mechanism while the hydraulic controller is in operation.

12. The brake system according to claim 10, wherein the controller changes the target pressing force by adding a pressing force corresponding to a delay in calculation of the signal for detecting the hydraulic pressure.

13. The brake system according to claim 10, wherein the electric mechanism is an electric motor, and wherein the target pressing force corresponds to a current threshold value for stopping driving the electric motor.

14. The brake system according to claim 13, wherein the current threshold value is set so as to increase as the hydraulic pressure in the brake apparatus decreases.

15. The brake system according to claim 13, wherein the current threshold value is set so as to be maintained at a larger value than a current value when the electric motor is driven with no load imposed on the electric motor.

16. The brake system according to claim 13, wherein the current threshold value is set so as to become equal to a predetermined maximum value within a range of the hydraulic pressure in the brake apparatus from zero to a predetermined value.

17. A brake system comprising:
a brake apparatus configured to keep a vehicle braked by an electric mechanism in response to a parking brake request signal, and brake the vehicle by supply of a hydraulic pressure from a hydraulic source in response to an operation performed on a brake pedal; and
a controller configured to drive the electric mechanism until a target pressing force is acquired to establish a brake holding state in response to the parking brake request signal,
wherein the controller is configured to change the target pressing force according to a change in a hydraulic pressure in the brake apparatus after starting driving the electric mechanism in response to the parking brake request signal,
wherein the electric mechanism is an electric motor,
wherein the target pressing force corresponds to a current threshold value for stopping driving the electric motor, and
wherein the current threshold value is set so as to become equal to a predetermined maximum value within a range of the hydraulic pressure in the brake apparatus from zero to a predetermined value.

* * * * *